(12) United States Patent
van Cruyningen

(10) Patent No.: US 10,509,417 B2
(45) Date of Patent: Dec. 17, 2019

(54) FLIGHT PLANNING FOR UNMANNED AERIAL TOWER INSPECTION WITH LONG BASELINE POSITIONING

(71) Applicant: Izak Van Cruyningen, Saratoga, CA (US)

(72) Inventor: Izak Jan van Cruyningen, Saratoga, CA (US)

( * ) Notice: Subject to any disclaimer, the term of this patent is extended or adjusted under 35 U.S.C. 154(b) by 194 days.

(21) Appl. No.: 15/558,363

(22) PCT Filed: Mar. 17, 2016

(86) PCT No.: PCT/US2016/022902
§ 371 (c)(1),
(2) Date: Sep. 14, 2017

(87) PCT Pub. No.: WO2016/149513
PCT Pub. Date: Sep. 22, 2016

(65) Prior Publication Data
US 2018/0095478 A1    Apr. 5, 2018

Related U.S. Application Data

(60) Provisional application No. 62/134,920, filed on Mar. 18, 2015.

(51) Int. Cl.
| | |
|---|---|
| *G05D 1/00* | (2006.01) |
| *G05D 1/10* | (2006.01) |
| *G01S 17/89* | (2006.01) |
| *G01S 19/14* | (2010.01) |
| *G01S 19/43* | (2010.01) |

(52) U.S. Cl.
CPC .............. *G05D 1/101* (2013.01); *G01S 17/89* (2013.01); *G01S 19/14* (2013.01); *G01S 19/43* (2013.01)

(58) Field of Classification Search
None
See application file for complete search history.

(56) References Cited

U.S. PATENT DOCUMENTS

| | | | |
|---|---|---|---|
| 4,818,990 A | 4/1989 | Fernandes | |
| 7,184,072 B1 | 2/2007 | Loewen | |
| 8,953,933 B2 * | 2/2015 | Ohtomo | G01C 11/00 244/190 |
| 9,371,133 B2 * | 6/2016 | Mays | B64C 39/024 |
| 9,612,598 B2 * | 4/2017 | Schultz | B64D 47/08 |
| 2010/0268409 A1 * | 10/2010 | Vian | G05D 1/104 701/24 |

(Continued)

FOREIGN PATENT DOCUMENTS

CA        2832956 A1    10/2012

*Primary Examiner* — Truc M Do

(57) ABSTRACT

Inspections of towers with unmanned aerial vehicles is challenging because judging the distance to narrow tower members, phase conductors, or guy wires is very difficult for people. These flights may be automated by first creating a three dimensional model of the tower from a scan; determining a safe standoff distance for the unmanned aerial vehicle; generating flight segments to provide complete inspection coverage of the tower while maintaining the standoff distance; and then safely and accurately flying the segments in most wind conditions by using location correction messages from remote reference stations.

16 Claims, 4 Drawing Sheets

(56) References Cited

U.S. PATENT DOCUMENTS

Figure 1:
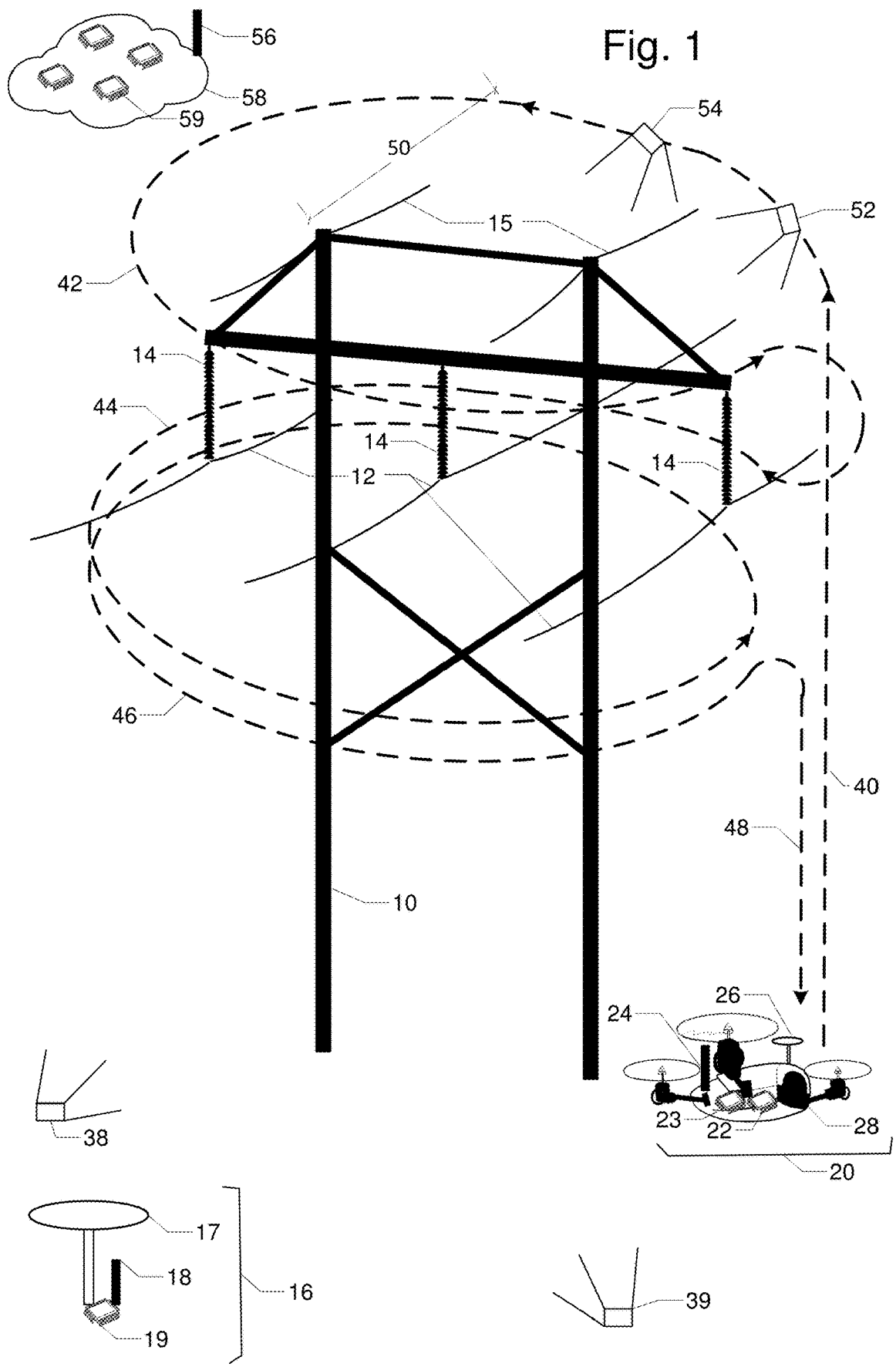

| | | | |
|---|---|---|---|
| 2012/0136630 A1* | 5/2012 | Murphy | G05D 1/0094 |
| | | | 702/188 |
| 2013/0317667 A1* | 11/2013 | Kruglick | B64C 39/024 |
| | | | 701/2 |
| 2014/0018979 A1* | 1/2014 | Goossen | G08G 5/0034 |
| | | | 701/3 |
| 2014/0046589 A1* | 2/2014 | Metzler | G01B 21/04 |
| | | | 701/514 |
| 2014/0303814 A1* | 10/2014 | Burema | A01B 79/005 |
| | | | 701/3 |
| 2014/0316614 A1* | 10/2014 | Newman | G06Q 30/0611 |
| | | | 701/3 |
| 2014/0336928 A1* | 11/2014 | Scott | G01N 21/88 |
| | | | 701/468 |
| 2015/0025788 A1 | 1/2015 | Crain et al. | |
| 2015/0116693 A1* | 4/2015 | Ohtomo | G01C 15/002 |
| | | | 356/4.01 |
| 2015/0347872 A1* | 12/2015 | Taylor | G01C 11/06 |
| | | | 382/224 |
| 2016/0269917 A1* | 9/2016 | Hillegas, Jr. | H04W 24/02 |

* cited by examiner

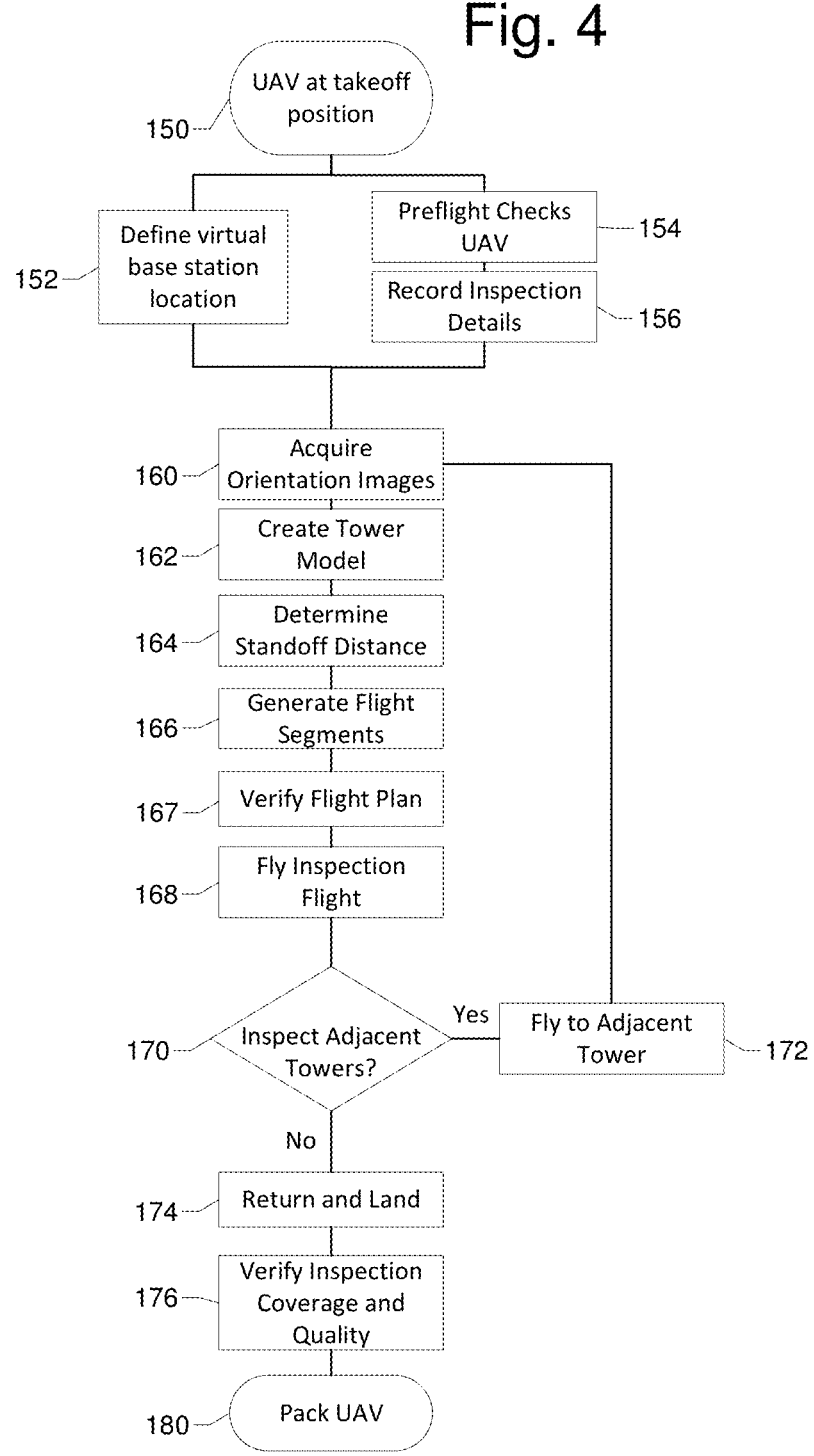

FLIGHT PLANNING FOR UNMANNED AERIAL TOWER INSPECTION WITH LONG BASELINE POSITIONING

CROSS-REFERENCE TO RELATED APPLICATIONS

This application claims the benefit of provisional patent application Ser. No. 62/134,920 filed 2015 Mar. 18 by the present inventor, which is incorporated by reference. This application is related to application PCT/US2106/020297, which is incorporated by reference.

BACKGROUND

Prior Art

Inspection, survey, or reconnaissance of towers and overhead lines aids in maintenance planning to prevent outages and deterioration. For example, problems in power transmission lines include:

insulator contamination from salt, pollution, avian waste, or cumulative partial discharge;

tower corrosion or avian nesting;

lightning strike damage on shield wires or surge arrestors; and right-of-way incursion by vegetation or man-made structures.

Ground-based inspection of towers, poles, utility corridors, and high voltage facilities such as substations is well known. For example, on high voltage transmission lines inspectors use a variety of inspection sensors such as binoculars, optical cameras with zoom lenses, thermal infrared cameras, solar blind ultraviolet cameras, radio frequency noise meters, and ultrasound meters. Linemen often use a combination of instruments to localize a defect. For example, in response to a radio frequency interference complaint on a distribution line they may locate the defect to within a few poles with AM radio frequencies; then they identify the specific pole with UHV frequencies (e.g. Radar Engineers Model 242); a component on the pole with ultrasound and a parabolic dish (e.g. Radar Engineers Model 250); and finally they may use a bucket truck with ultrasound on a hotstick (e.g. Radar Engineers Model 247B) to pinpoint the defect. Bucket trucks are expensive to mobilize and difficult to get into rough terrain. An unmanned aerial system (UAS) is safer because it keeps people on the ground and away from high voltage lines. It is also much easier to deploy.

Symptoms of defects such as arcing, corona, and partial discharge produce pulses that radiate light, sound, and heat. They can be considered point sources that radiate the energy as an expanding sphere so the signal strength decreases with the distance from the defect squared (RF noise is carried along the lines so it decreases less quickly). To locate defects from the ground requires instruments with narrow fields of view and very high gain, yet they still tend to have low signal to noise ratios. For example, the solar blind UV Corona cameras have fields of view between six to eight degrees. They contain multi-channel plates that provide a signal gain of two million, yet the camera still operates in photon counting mode with just a few thousand counts per minute. Similarly, an optical camera with a high power zoom lens has a very narrow field of view to focus on finding a defect, but it requires high ISO settings and thus produces noisier images.

A narrow field of view necessitates a slow precise scan to cover the entire object of interest—in a handheld manual scan it is very easy to accidentally miss areas. Complete coverage at maximum resolution is unlikely. Low signal levels usually require averaging over a number of readings to reliably detect defects, thereby further slowing down the inspection.

Manned aerial inspection using helicopters and light aircraft provides visibility on the top surfaces of the lines and towers. For safety reasons, manned aircraft fly roughly the same distance away from the lines as the ground clearance, so the instruments used are similar. About 5% of helicopter accident fatalities are due to wire strikes. It is even more difficult to provide full inspection coverage in a rapidly moving manned aerial platform. Instruments with a narrow field of view potentially miss many defects, while instruments with a wide field of view make it difficult to accurately locate the defect.

Unmanned Aerial Vehicles (UAV) have been used in these inspections. The inspection instruments are brought much closer to the tower and lines so defects are easier to detect and locate. However, flying a UAV manually in an inspection poses a number of problems:

Learning to fly by remote control is a significant challenge for most operators. It requires fine hand-eye coordination, as well as awareness that directions depend on whether the UAV is flying towards or away from the pilot in command.

It is difficult to see lines, guy wires, and narrow tower elements and to judge depth or distance accurately. This makes it difficult to position the UAV accurately to meet inspection resolution and coverage requirements without collisions with the towers or lines.

A pilot has slower reaction times than an autopilot, so in a wind gust or thermal the pilot reacts later and then oversteers or over powers to bring the UAV back into position.

Flying a regular pattern to provide full coverage during the inspection is both tedious and difficult.

Batteries with the highest energy density (kWh/kg) often allow only very slow discharge (2C) rates. For an electric powered UAV, it is desirable to use these batteries and run the motors at 25-50% of maximum power to maximize efficiency and flight times. Autopilots generally react quicker and apply power more smoothly so battery-damaging peak powers are not reached. Airlines use the autopilots when they want to fly the most fuel-efficient path.

The energy efficient batteries cannot be discharged too far without damage. A human pilot typically hears a buzzer or sees a warning when the battery levels are getting low and then brings the UAV back in for a landing. An autopilot can monitor the battery levels almost continuously and then optimize the remaining flight time more carefully.

Manual control is sometimes supplemented with a first person view (FPV) camera to direct and frame the inspection. This allows a trained operator to detect potential defects in real time while the UAV is in the air and to take a closer look. The idea is to provide full coverage from a distance and to fly in close on the defects. However, in most jurisdictions this requires a second operator because the pilot in command must observe the UAV in line of sight with the unaided eye. Due to limited radio bandwidth, the resolution of FPV systems is typically much less than that of inspection cameras. It is generally more efficient to capture inspection data at full zoom with full coverage for post-flight review, rather than to find defects and zoom into them during flight. Memory and bandwidth become less expensive every year, while trained operators become more expensive.

What is needed is an automated unmanned aerial system (UAS) that allows close-in inspection with full coverage of a tower and lines. In one example scenario, an operator drives or walks to the tower of interest. They unpack, locate the UAV relative to continuously operating reference stations distant to the tower, and prepare the UAV for flight. Then, they use the UAV to take orientation photos from several vantage points. These photos are processed using photogrammetric software to accurately scan and locate the tower relative to the reference stations. A flight plan is automatically constructed to provide complete inspection coverage at a standoff distance that meets inspection resolution and safety requirements. The UAV flies the flight while recording inspection data; the operator verifies the data quality and coverage; and packs up the system.

SUMMARY

FIG. 1 is a perspective view of transmission tower 10, phase conductors 12, insulators 14, and shield wires 15. They are to be inspected by unmanned aerial vehicle UAV 20 with embedded processor and memory 22, radio 24, location rover 26, and camera 28. Continuously operating reference station 16 has GNSS antenna 17, GNSS receiver 19, and radio 18. The relative location between UAV 20 and reference station 16 can be accurately calculated using location corrections sent by radio 18 to radio 24. Camera 28 on UAV 20 is first used to capture two or more orientation images 38 and 39 of tower 10; lines 12 and 15; and insulators 14 from different vantage points. Terrestrial or close-range photogrammetry techniques are used create a three dimensional model of tower 10; lines 12 and 15; and insulators 14. Based on inspection resolution and safety objectives, a standoff distance 50 is determined. Then a flight path with segments for ascent 40, one or more loops 42, 44, 46, and a descent 48 is designed to ensure full inspection coverage via inspection images like 52 and 54.

ADVANTAGES

Inspection of towers and overhead lines is well known in the prior art. The novel approaches for the tower inspection system described here are superior because:

Unmanned aerial inspection is safer because it keeps people away from high voltages and on the ground.
Unmanned aerial inspection brings the inspection sensors closer to defects so they have both higher signal levels and higher spatial resolution than ground-based or manned aerial inspection sensors.
Automated measurement of tower location ensures accurate, current location data without requiring prior knowledge.
Automated determination of stand-off distances ensures no contact with towers and lines while meeting inspection objectives in current weather conditions.
Automated flight planning ensures full inspection coverage of the tower.
With automated flight execution the operator does not need to learn and practice the fine-grained motor skills necessary for remotely piloting a vehicle.
Wider fields of view flown close-in with significant overlap ensure nothing is missed.
Navigation using accurate relative positions reduces reliance on a compass which can be inaccurate in the presence of strong magnetic fields near high voltage equipment.

Other advantages of one or more aspects will be apparent from a consideration of the drawings and ensuing description.

FIGURES

FIG. 1. Perspective view of H-frame transmission tower, UAV, reference station, and inspection flight path.

Figure 2:
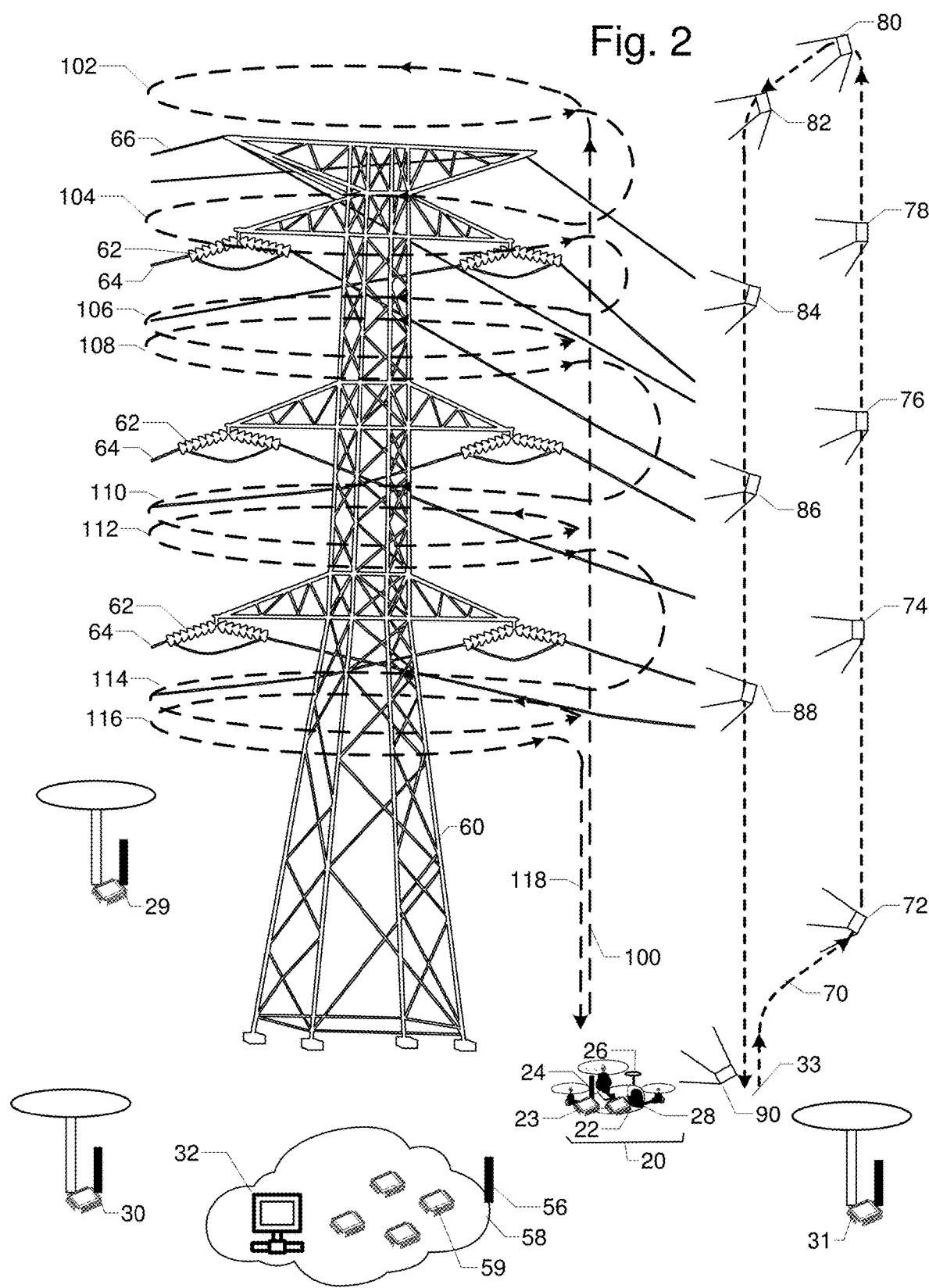

FIG. 2. Perspective view of lattice transmission tower, UAV, orientation flight path, network RTK server, and inspection flight path.

Figure 3:
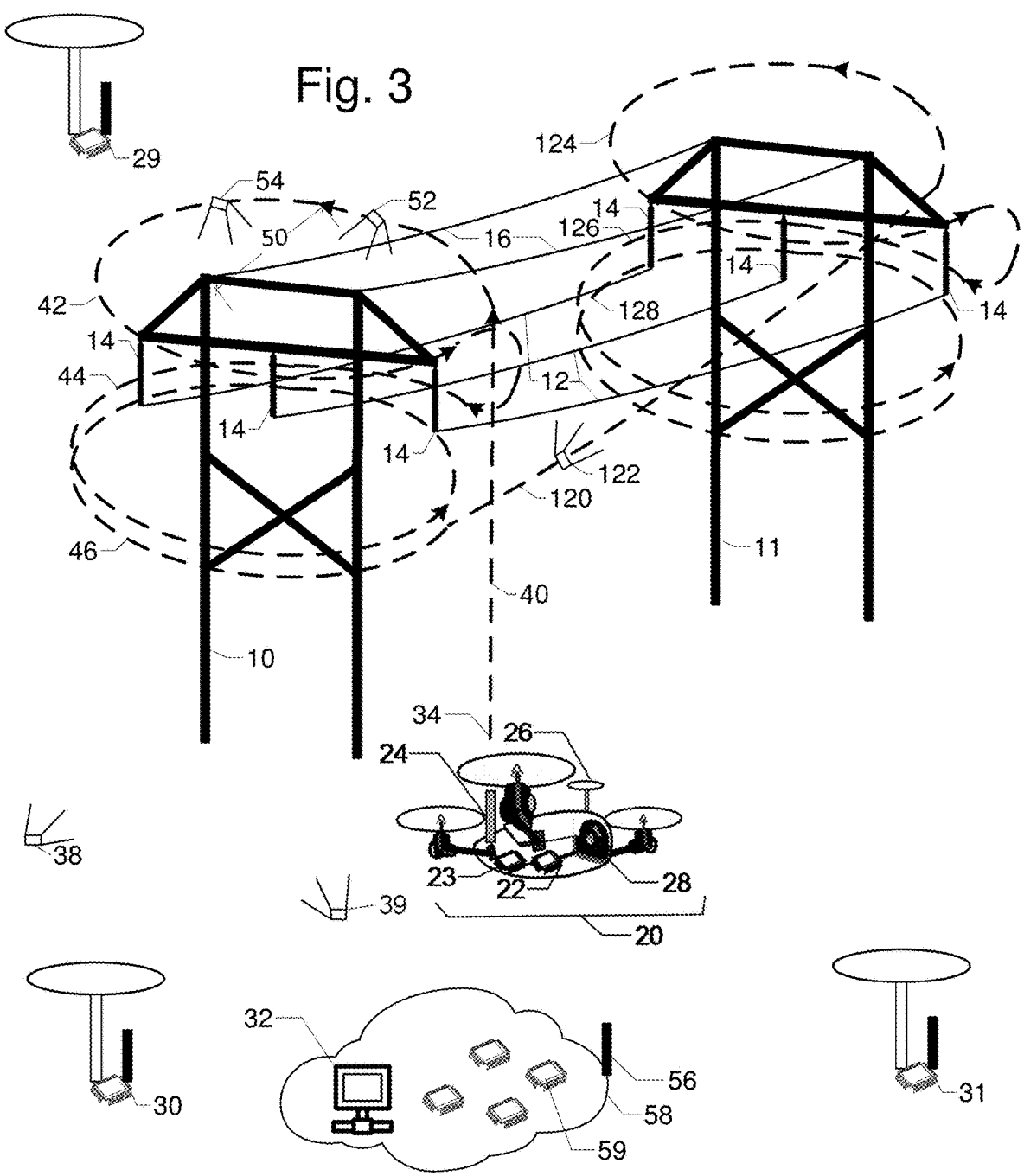

FIG. 3. Perspective view of two H-frame towers in a transmission line, UAV, network RTK server, and inspection flight path.

FIG. 4. Flow chart for tower inspection process using an unmanned aerial vehicle.

DETAILED DESCRIPTION

This section describes several embodiments of the tower inspection system with reference to FIGS. 1-4.

FIG. 1 is a perspective view of a transmission line H-tower 10 commonly used in single circuit transmission lines. Tower 10 supports insulators 14, which in turn support phase conductors 12. Tower 10 also supports shield wires 15 that reduce the impact of lightning strikes. A continuously operating reference station 16 with GNSS antenna 17, radio 18, and GNSS receiver 19 is located at a known fixed position remote from tower 10. An unmanned aerial vehicle (UAV) 20 has embedded processor and memory 22, inertial measurement unit (IMU) 23, radio 24, location rover 26, and camera 28. Orientation images 38 and 39 are taken from several vantage points. The inspection resolution and safety requirements determine standoff distance 50. Flight path with segments for ascent 40; loops 42, 44, and 46; and descent 48 maintains standoff distance 50 while providing complete inspection coverage via inspection images like 52 and 54. A communication connection with the Internet 56 allows connection to additional computational resources with many other processors and memory 59 in the computing cloud 58.

To fly a tower inspection with a UAV requires accurate, close-in piloting relative to a fixed structure on earth. Errors in navigation or gusts of wind may cause collisions and mission failure. This is substantially more challenging than flying the grid pattern common in other applications of UAVs. When flying a grid pattern for mapping, surveying, agricultural inspection, or search and rescue, a navigational error or gust of wind will simply displace the airframe. This displacement reduces the overlap of adjacent photos, therefore requiring more post-processing, but it does not endanger the UAV. A navigation error or gust during a tower inspection may push the airframe into the tower, typically causing the airframe to fall out of the sky.

Stand-off distance 50 can be measured directly during the flight to keep the UAV safe. Near real-time, non-contact distance measurements can be done with, for example:

Active systems that emit a pulse of light (LiDAR), radio waves (RADAR), or sound (SONAR) and measure the time of travel for an echo or reflection.
Active systems that emit structured or modulated light and measure the patterns reflecting off objects.

Passive systems that use stereo measurements with multiple sensors or cameras. These sensors act at the speed of light or sound making the distance measurement is available within fractions of a second, so they can be described as near real-time.

Direct distance measurements are conceptually easy to understand, provide near real-time performance, and can be used with moving objects. For example, U.S. Pat. No. 7,184,072 discloses power line inspection with LiDAR where the distance to the towers and lines is measured directly during flight. US 2012/0136630 discloses inspection of wind turbines using a "distance measuring system or device [that] can comprise contact type collision detectors, electromagnetic transceivers, acoustic transceivers, laser transceivers, radar transceivers, visually based receivers, and RFID tag transceivers". However, systems for directly measuring the stand-off distance during flight require more power, are heavier, more expensive, more fragile due to rotating or scanning mechanisms, require annual calibration, and potentially pose eye hazards (LiDAR).

The approach advocated in the embodiments described here is to break the location measurement down into stages: First, accurately locate and measure objects of interest, such as tower 10, insulators 14, and lines 12 and 15, as well as possible obstacles relative to reference station 16. Then plan flight segments 40, 42, 44, 46, and 48 relative to reference station 16 that meets the inspection resolution and safety requirements. Finally accurately fly this flight path relative to reference station 16.

Location measurement in stages is less intuitive for most people. It is easy to understand directly measuring the distance between UAV 20 and objects of interest and obstacles such as tower 10, insulators 14, and lines 12 and 15. In contrast, in the embodiments described here, two distances relative to reference station 16 are measured and the direct distance is inferred. The benefit is that much of the weight and power required to determine location is moved into reference station 16 instead of burdening UAV 20.

Regular GPS navigation using CA satellite signals provides absolute GPS positions accurate to about 3 m CEP horizontally and twice that vertically. Differential GPS corrects for ionosphere distortions and other errors to improve the accuracy by an order of magnitude for locations which are reasonably near to a reference station and can receive the correction broadcast signals. Measurements from satellite photos, such as Google Maps, provide roughly 3 m accuracy due to registration errors. CN 102510011 suggests using absolute positioning of towers from maps or GPS systems. Further location information can be gleaned from design documents and as-built surveys.

However, at the time of inspection, things have often changed from the original design or last survey:
- Single pole distribution towers are often out of plumb in expansive soils or on a slope.
- H-towers such as tower 10 in FIG. 1 may be pushed up, or walk out of the ground in soggy or freeze-thaw conditions.
- Guyed towers may slowly sink into the ground.
- Storms may have damaged the towers.
- Vandalism may have removed tower components, etc.

One of the inspection objectives may well be to measure how far the tower has currently deviated from the original design. To safely fly around the tower requires accurate measurement of the current position of the tower just before the flight.

In the embodiments described here, tower 10, insulators 14, lines 12 and 15, and any obstacles are accurately scanned and measured relative to reference station 16. Three dimensional scanning includes contact and non-contact approaches. Non-contact scanning is more appropriate for the embodiments described here and includes, for example:
- scanning versions of time of flight (LiDAR, RADAR, SONAR),
- three dimensional flash LiDAR,
- active structured or modulated light techniques,
- passive stereo cameras,
- passive photometric or photogrammetric techniques.

A photogrammetric scanning approach, described in greater detail below, uses a camera to take orientation photographs 38 and 39 from a number of vantage points. Software based on multiple view geometry processing reconstructs a model of the tower to be used in flight planning. The photogrammetric scanner approach requires more capable computing hardware, but it can use camera 28 as a sensor and does not require a LiDAR scanner.

After the objects of interest are modeled and a flight plan constructed, then UAV 20 has to accurately fly the plan. This requires accurately locating UAV 20 relative to reference station 16 in near real time during flight. This could be measured by any of the near real-time direct measurements described earlier, namely active time of flight measurements, active structured or modulated light techniques, or stereo vision techniques. One possible technique to accurately locate UAV 20 relative to reference station 16 is real time kinematic (RTK) GPS, as described in the next few paragraphs.

Short baseline real time kinematic (RTK) GPS systems use signal carrier phase information from a number of GNSS satellites to provide relative positions between a local base station and a rover accurate to centimeters. A base station fixed for the duration of the inspection communicates location correction information to a moving rover so the relative position between the two can be calculated to centimeter accuracy. RTK GPS does not provide any better absolute accuracy than GPS, but accurate relative positions are sufficient for the inspection approach described here.

Long baseline RTK GPS relies on continuously operating reference stations at known permanent locations, typically far from the inspection location. A reference station 16 knows its permanent position and thus receiver 19 can measure errors in the GNSS signals received on GNSS antenna 17. It transmits these location corrections on radio 18. In a cluster RTK configuration, reference stations typically broadcast their corrections on UHV, VHF, or spread spectrum radio frequencies. Radio 24 on UAV 20 would receive the corrections so location rover 26 can identify UAV 20's location relative to reference station 16. Typically the corrections from the closest reference station are used to minimize the baseline length. Using a single remote reference station works for baselines up to about 20 km with 5 cm precision. Corrections become uncorrelated over longer distances. For cluster RTK, the reference base station is defined as the closest of the continuously operating reference stations.

In a network RTK implementation, multiple continuously operating reference stations communicate with a network RTK server, as described in greater detail with reference to FIG. 2 below. Location rover 26 first provides a rough estimate of its initial location to the network RTK server. Then the network RTK server interpolates corrections from the surrounding reference stations for that initial location. The initial location becomes a virtual base station location, from which locations are measured at the inspection site. Interpolating corrections allows the reference stations to be 50 km from the inspection location and still maintain 5 cm accuracy. For a network RTK embodiment, the reference base station is the virtual base station location defined by the initial rough location transmitted to the network RTK server.

This section describes a photogrammetric and cluster RTK GPS embodiment in greater detail with reference to FIG. 1. An operator doing an inspection assembles UAV 20, goes through the preflight checklist, and enters inspection objectives. Radio 24 receives GNSS corrections from radio 18 on the nearest reference station 16.

The operator then begins a scan to determine the relative location of the objects of interest, which are tower 10, insulators 14, and lines 12 and 15 in this case. The operator carries UAV 20 to different positions around tower 10 and camera 28 takes orientation images such as 38 and 39 of tower 10, insulators 14, and lines 12 and 15. UAV 20 saves its location relative to reference station 16 along with each image as it is saved in embedded processor and memory 22. More orientation images from different vantage points improve scan accuracy of the objects of interest, but require more time to acquire and process. At least two images from different vantage points are required and this is sometimes enough for a simple distribution line tower with a single pole and crossbar. Four images may be enough for the simple H-frame tower 10 shown here. More complex double circuits with lattice towers may require many more images, particularly if they share towers with, or cross, distribution lines or telecommunication lines. Other types of towers such as radio or communication towers with multiple guy wires, suspension bridge supports, bridge supports under a deck, statues, sculptures, or trees would require many more images to map in three dimensions.

When the orientation image acquisition is complete, photogrammetric software is used to rectify the images and create a 3D model of the tower and lines. Sample software to perform this task includes AutoDesk 123D Catch, Recap Photo, Pix4D, AgSoft, or many other such similar programs. Wikipedia lists about fifty packages in their "Comparison of photogrammetry software" article, many of which can be used for the terrestrial or close-in approach to scanning the tower described here. This software is computationally expensive meaning it requires a lot of computer processing and thus electrical power. It could be run on embedded processor and memory 22, or, if radio 24 includes capability for connecting to the Internet 56, on many computers 59 connected to the Internet in the computational cloud 58. These have different bandwidth versus computation time trade-offs.

Running the photogrammetry software on embedded processor and memory 22 does not require communicating the orientation images so minimizes communication bandwidth. However, the embedded processor and memory 22 will have to be quite powerful and thus will use quite a lot of energy, thereby deducting from the flight time of UAV 20. In contrast, enormous computational power is available in computational cloud 58, but communication of a number of high resolution orientation images like 38, 39 may tax the bandwidth of Internet connection 56.

After constructing a three dimensional model of the measured of tower 10, insulators 14, and lines 12 and 15 relative to reference station 16, the next step is to determine standoff distance 50. A short distance gives high spatial resolution and high signal levels for the inspection but reduces safety. The useful distance is a compromise based on inspection objectives, inspection optics, accuracy in measuring UAV location, safety requirements, UAV stability or responsiveness, and current wind or thermals. The following description uses an optical camera as an example, however the same principals apply to UV cameras, IR cameras, electromagnetic field sensors, and ultrasound microphones.

Inspection objectives can be summarized by the sample distance with respect to the tower and the signal to noise ratio (SNR) of each sample. The sample distance must be less than half the size of the smallest defect to be detected. For example, to detect lightning damage on shield wires 15 requires a sample distance of a few millimeters because the wires are about 8-12 mm in diameter. It does not require a high SNR since shield wire 15 is either there or partially melted away. A gunshot hole in a component of tower 10 or insulators 14 requires roughly the same spatial resolution and SNR. Contamination on insulators 14 is spread over a larger area, and can be detected with a larger sample distance, but it requires a higher SNR to provide contrast with clean insulators. Avian nests or bent structural elements in the tower are much larger and can be resolved with sample distances of multiple centimeters and relatively low SNR. The high voltage ends of insulators 14 holding phase conductors 12 are subject to the highest electric field gradients so they should be inspected at high spatial resolution and high dynamic range. Different parts of the inspection flight may require different sample distances and SNR, and thus different standoff distances.

Given the required sample distance at the tower, the corresponding standoff distance 50 can be determined from the sensor pixel pitch and lens focal length using similar triangles. For example, suppose the desired tower sample distance is 2 mm and the inspection is done with a sensor with 6 micron pixels and a 35 mm focal length lens. Then the maximum standoff distance is about 12 m.

When taking inspection images from one side of tower 10, it is desirable to also keep the other side of the tower in focus to provide inspection coverage from multiple angles. To keep the entire tower in focus, standoff distance 50 should not be smaller than half the hyperfocal distance. If the example from the previous paragraph is extended to use an aperture of F/8 and a circle of confusion of two pixels, then the hyperfocal distance is 12.8 m. Thus the standoff distance should be no closer than ~6 m to keep the entire width of tower 10 in focus.

In low light levels (dawn, dusk, or overcast skies) the aperture may need to be opened up to maintain the desired SNR. Then the depth of field decreases and the resolution may decrease because of diffraction. This is the tradeoff for performing inspections at lower light levels.

Each UAV model can be characterized by stability criteria. For example, the DJI Phantom 2 has a hover stability of 2.5 m horizontal and 0.8 m vertical. Standoff distance 50 should be a multiple of this distance to provide a margin of safety. Wind gusts or thermals at the time of the flight increase the safety margin required. With no wind, a multiplier of 1.5-2 may be sufficient. A steady wind is not as much of a problem as a gusty wind since gusts cannot be anticipated. With winds more than 3-5 m/s over land in the presence of towers, the earth's boundary layer is likely turbulent and gust fluctuations of +/−20% of the wind speed are expected. UAV 20 response time (typ. $\frac{1}{10}$-$\frac{1}{2}$ sec) multiplied by the gust strength determines the additional safety margin required. Above a certain wind speed it is better to postpone the inspection. This maximum wind speed is at least 20% less than the top speed of the UAV, because gusts will make it impossible to maintain a reasonable standoff distance 50.

The accuracy of the relative location between UAV 20 and reference station 16, as well as the accuracy of the tower scan should be added to the UAV stability criteria. The RTK GPS described in this embodiment can determine relative location with centimeter level accuracy. The photogrammetric reconstruction of tower 10, insulators 14, and lines 12 and 15 location is likely to be somewhat less accurate if using only two orientation images. The more orientation photographs 38, 39 and the more detail on the camera interior and exterior orientation, the more accurate the three dimensional reconstruction.

Once the 3D model and standoff distance(s) are determined, the next step is to generate flight segments 40, 42, 44, 46, and 48 to create a flight plan. Like the photogrammetric calculation, this can be done either on embedded processor and memory 22 or on processors connected to the Internet in computing cloud 58. To minimize communication bandwidth, it may be best to do it on the processor(s) that created the 3D model.

First segment 40 is an ascent that can be almost vertical for rotary or tilt wing UAVs, or at a steep climb angle for fixed wing UAVs. For a rotary wing a gradual sideways descent avoids descending in its own downwash. For a fixed wing it is beneficial to climb the entire way up first and then save some power in the gradual glide down. With a UAV that has a good glide ratio it may be possible to turn off the motors during the parts of the downward spiral to reduce vibration.

Single pole distribution towers and circularly symmetric towers like many communication towers, statues, and trees can be inspected with circular flight segments. Most transmission line towers and bridge supports are wider across the right of way than along the right of way. Power line towers have to maintain separation between phase conductors and resist the lateral pressure of wind on the wires in adjacent spans. Oval, elliptical, or looping flight segments 42, 44, 46 provide a relatively constant standoff distance 50. Load along transmission lines is taken up at dead ends or corners where strain insulators, rather than suspension insulators are used. To properly inspect those strain insulators requires an oval with a larger minor axis. Electrical substations typically occupy a rectangular area and require a rectangular flight segment with rounded corners. If only one side of a tower needs to be inspected, a flight segment may be a partial loop or line.

Top loop 42 is flown with camera 28 and other inspection sensors oriented downward to capture shield wires 15 in detail and the top of tower 10 at slightly lower resolution. The high voltage ends of insulators 14 (and corona or grading rings if fitted) suffer some of the highest electrical gradients so they should be inspected in detail. Middle loop 44 is flown with camera 28 and other inspection sensors oriented upward to capture the insulator ends in detail and the bottom of the crossbar on tower 10 at a slightly lower resolution. Lower loop 46 is flown with camera 28 oriented horizontal or downward to inspect the poles and cross-bracing on tower 10. Depending on the relative height of the field of view and the tower, more loops may be required to provide full coverage of the tower before descent segment 48.

The dimensions of the flight segment loops and the number of loops are determined from the three dimensional model of the tower. The model may be a point cloud, a mesh, a surface model, or a CAD model, depending on the reconstruction software used. The scale and orientation are known from the camera interior and exterior orientations while capturing the images. Using a point cloud model as an example, the first task is to find the top of the tower. This can be done with a search up from the centroid of the point cloud to find the highest group of a hundred or so points near the center of the model. The average of this group defines the center of the top of the tower. From here a cylindrical search outward of the top half of the model finds the ends of the cross-arms, the insulators, and then the wires. The wires may be at different angles at corner towers, but the cross-arms always bisect the wires and are opposite each other from the center of the tower. The cross-arm length plus twice the standoff distance sets the major axis of a flight loop. The cross-arm width plus the length of strain insulators (if any) plus twice the standoff distance sets the minor axis.

The speed which flight segments 40, 42, 44, 46, and 48 can be flown depends on UAV 20 capabilities, and camera 28 framing rate and shutter speed. If the UAV is a fixed wing it must fly above its stall speed. Both fixed wing and rotary wing airframes have maximum speeds; however these are less likely to be a limitation than camera 28 shutter speed. For any nearly straight sections of a flight segment, camera 28 is moving across the scene. A reasonable criterion is a speed low enough that UAV 20 does not move more than half a sample distance while the shutter is open. If forward motion compensation is used, or for areas where the flight segment is an arc about the point of interest, the shutter speed becomes less of an issue. Adjacent images should be overlapped to avoid gaps due to wind gusts, to improve photo stitching for mosaics, and for rectification for 3D reconstruction. Thus given the framing rate of the camera and the horizontal field of view at the tower, the maximum flight speed can be calculated to maintain overlap.

FIG. 2 is a perspective view of a transmission line lattice tower 60 used in double circuit transmission lines. Tower 60 supports insulators 62 that in turn support phase conductors 64. Tower 60 also supports shield wires 66. Continuously operating reference stations 29, 30, and 31 communicate with network RTK server 32, typically located on the Internet cloud 58 with many other processors 59 and a communication radio 56. UAV 20 contains embedded processor and memory 22, IMU 23, radio 24, location rover 26, and camera 28. Orientation flight 70 starting from virtual base station location 33 is used to capture orientation images 72, 74, 76, 78, 80, 82, 84, 86, and 88. Additional orientation images 90 may be captured from the ground or on the other sides of tower 60. The inspection flight has segments 100, 102, 104, 106, 108, 110, 112, 114, 116, and 118.

This embodiment uses a network RTK approach to location measurement. Continuously operating reference stations 29, 30, and 31 are at known permanent positions, typically far from the inspection location. They continuously measure the errors on the GNSS signals and communicate the corrections to network RTK server 32. When the operator sets up for the orientation flight starting at position 33, location base 26 transmits a rough estimate of its location through radio 24 to radio 56, either directly connected to network RTK processor or through the Internet 58. Network RTK server 32 interpolates the corrections from nearby reference stations 29, 30, and 31 to provide the best possible corrections for virtual base station location 33. Then it sends corrections for virtual base station location 33 for the duration of the inspection. The tower model and the flight segments 100, 102, 104, 106, 108, 110, 112, 114, 116, and 118 are all located relative to this virtual base station location 33.

A more complex tower requires more orientation images to measure its location relative to virtual base station location 33. Rather than taking all the orientation images from locations on the ground, an orientation flight provides much better image angles. For tall, double circuit lattice tower 60, orientation flight 70 is flown at several times the estimated standoff distance to capture many more orientation images 72, 74, 76, 78, 80, 82, 84, 86, and 88 from different heights and angles.

The more that is known about camera 28 interior and exterior orientations, the faster and more accurate the convergence of the photogrammetric process to build the 3D model of objects of interest such as tower 60, insulators 62, phase conductors 64, and shield wires 66. Interior orientation parameters depend only on the camera and lens, and can be measured during calibration prior to coming out into the field. Exterior orientations include the position (x, y, and z) and angles (roll, pitch, and yaw) relative to virtual base station location 33 at the time of exposure of an orientation image such as 72. The position (x, y, and z) is determined by the RTK positioning approach. Orientation (roll, pitch, and yaw) can come from the inertial measurement unit (IMU) 23 in UAV 20. Alternatively, multiple location rover units can be mounted in fixed positions on UAV 20 and the measurements differenced to determine UAV 20 orientation relative to virtual base station location 33.

Capturing a known scale in the images also helps in photogrammetric convergence. This may be as simple as a known dimension of tower 60, a printed scale captured in a photograph, or a measured distance between virtual base station location 33 and tower 60. The distance between tower 60 legs at the ground is also often standardized and helps in calibration if it is captured as part of some of the images 72, 74, 76, 78, 80, 82, 84, 86, 88, and 90.

Orientation flight 70 improves the accuracy of vertical measurements in the 3D reconstruction. Phase conductors 62 are usually pairs or triplets at equal elevations. At the elevation in flight 70 where the front conductor occludes the back conductors, UAV 20 is at the altitude of those conductors. The phase conductor 62 and shield wire 66 altitudes can also be found with a cylindrical search in the point cloud. The wire altitudes set the altitudes of flight segments 102, 104, 106, 108, 110, 112, 114, and 116.

Orientation flight 70 also makes it much easier to measure wind and gusts at different elevations. Measuring drift during a short hover at a particular elevation will give the wind speed to +/−20%. This feeds into the standoff calculation for the corresponding loop flight segments 102, 104, 106, 108, 110, 112, 114, and 116. A longer hover can give a better estimate of average wind speed and gustiness (mean and standard deviation), as well as platform stability.

FIG. 3 is a perspective view of two adjacent transmission line H-towers 10 and 11. Towers 10 and 11 support insulators 14 that in turn support phase conductors 12. Towers 10 and 11 also support shield wires 15. Continuously operating reference stations 29, 30, and 31 communicate with network RTK server 32 located on the Internet cloud 58 with many other processors 59 and a communication radio 56. Virtual base station location 34 is at the start of the flight. UAV 20 has embedded processor and memory 22, IMU 23, radio 24, location rover 26, and camera 28. Orientation images 38 and 39 are taken from several vantage points around tower 10. The inspection resolution and safety requirements determine standoff distance 50. Flight path with segments for ascent 40, loops 42, 44, and 46, and descent 48 maintains standoff distance 50 while providing complete inspection coverage via inspection images like 52 and 54. Following inspection of tower 10, UAV 20 flies path 120 to tower 11 taking orientation images 122 along the way. At tower 11, UAV 20 flies similar inspection loops 124, 126, and 128 to inspect tower 11.

Continuously operating reference stations 29, 30, and 31 are at known permanent positions, typically far from the inspection location. They continuously measure the errors on the GNSS signals and communicate the corrections to network RTK server 32. When the operator sets up for the flight starting at position 34, location base 26 transmits a rough estimate of its location through radio 24 to radio 56, either directly connected to network RTK processor or through the Internet 58. Network RTK server 32 interpolates the corrections from nearby reference stations 29, 30, and 31 to provide the best possible corrections for virtual base station location 34. Then it sends corrections for virtual base station location 34 for the duration of the inspection.

Many transmission lines have similar tower configurations along the line. Exceptions include transposition towers at the ⅓ and ⅔ distances, corners, or taller towers where the line crosses a waterway or freeway. If the operator visually verifies the adjacent towers have similar configurations, then the inspection flight can be extended to adjacent towers without resetting virtual base station location 34.

Instead of landing after the inspection of tower 10 is complete, UAV 20 flies path 120 to the next tower. UAV 20 knows the direction to fly from the original measurement of phase conductors 12 and shield wires 15 using orientation images 38 and 39. As UAV 20 flies, it takes repeated orientation photos 122 until tower 11 comes into view. At that point it compares a scale item, such as the width of the crossbar, from photo 122 with the measurements of tower 10. UAV 20 knows its own position at the time of exposure for orientation photo 122, so it can calculate the position of tower 11 relative to tower 10. Then it applies a translation of the flight plan for loops 42, 44, and 46 to fly loops 124, 126, and 128 around tower 11.

After loop 128, UAV 20 could repeat the process and continue to the next tower for inspection. The number of adjacent towers inspected from one base station location is the smaller of the government regulations regarding line-of-sight, flight time for UAV 20, and the range for radios 24 and 56. For flights over 20 km the corrections from virtual base station location 34 would start to become inaccurate. UAV 20 could land, transmit a new rough location to network RTK processor to create a new virtual base station location, and then takeoff to continue the inspection.

An extension of this idea that would work even for dissimilar towers is whenever UAV 20 reaches adjacent tower 11, it would first perform an orientation flight 70, as described in FIG. 2. Based on the orientation flight for the new tower it would create a new tower model and new flight plan for the next tower. This same concept works for towers on adjacent lines.

FIG. 4 is a flowchart of the tower inspection process using the photogrammetry and network RTK GPS embodiment for a power line tower. On arrival near the tower, the operator first places UAV 20 at the takeoff position 150 for the orientation flight near tower 10. The takeoff should be several estimated standoff distances from tower 10 for safety.

To define the virtual base station location 152, location rover 26 begins to acquire GNSS satellites and transmits its rough location to network RTK server 32 which defines a virtual base station location 33 and begins transmitting correction messages for that location. The operator goes through the preflight checklist for the UAV 154 and records inspection details 156. Then the UAV 20 is moved around the base of the tower, or flown in an orientation flight 70, to acquire orientation images 160. Photogrammetric software uses these orientation images to create a tower model 162. The inspection objectives and current meteorological conditions are used to determine a standoff distance 164. Using the tower model and standoff distance, flight segments are generated 166 to provide a flight plan with complete inspection coverage of the objects of interest. The operator verifies the flight plan 167 to double check of the model and standoff distances. Using the flight plan, the UAV flies the inspection flight 168 while recording with the inspection sensors. If the operator requested inspection of adjacent towers 170, then the UAV flies to the adjacent tower 172 and starts to acquire orientation images 160 again. When the inspection flight is complete, the UAV returns and lands 174. The operator verifies the inspection coverage and quality 176, and then packs up 180.

The inspection details 156 include the tower identifier, the inspection objectives, and any information that may help measure and model the tower. The tower identifier is usually printed on a plaque and can be manually entered by the operator or simply photographed with camera 28. The inspection objectives include the sensors to be used and details for their operation. For example, for camera sensors (Optical, IR, or UV), the inspection parameters for a given lens and sensor include the desired sample distance, the signal to noise ratio, and the image overlap. The operator also has to indicate if, and how many, adjacent towers to inspect and whether they have the same geometry.

While there are hundreds of possible tower geometries, if the operator enters just a few easily observable parameters, the tower inspection system can make a much better check on the measurements and model of the tower. The operator and the tower inspection system work together to produce a better outcome. People are much better at big picture objectives and pattern recognition, while UAV 20 is much better at detailed flying.

Entering the line voltage gives a good estimate of the clearance between phase conductors, as well as the length of the insulator strings. The number of circuits (1 or 2) gives an indication of how many phase conductors (3 or 6). The arrangement of the lines from the top down gives a quick check on the gross width and height of the tower. Thus for a double circuit line, a 2-2-2-2 arrangement has two shield wires on top and paired phase conductors further down. This tower will be tall and narrow. The width will be about the phase separation for that voltage, while the height will be more than four phase separations. A 2-6 arrangement will be shorter and much wider. Indicating whether suspension or strain insulators are installed gives another check on the height of the tower and the required dimensions of the inspection flight loops such as 42, 44, 46, 102, 104, 106, 108, 110, 112, 114, and 116. The gross tower geometry, whether single pole, H-Frame, lattice, Y-guyed, V-guyed, or substation gives a quick check on the model and indicates whether the inspection loops 42, 44, and 46 should be circular, oval, or rounded rectangles; and whether the loops are all about the same size (pole, H-Frame) or if the loop size varies with altitude (lattice, guyed, substation, trees, statues, communication towers, bridge supports, etc.). The operator can also indicate whether the tower is symmetric, either across the right of way or along the right of way. Either symmetry would reduce the number of orientation images required to scan and locate the tower.

Following setup, the next step is to acquire orientation images 160. For a very simple tower like a single pole distribution line, the operator carries UAV 20 around tower 10 and takes images 38, 39 with camera 28. For a more complex lattice tower, guyed tower, or substation, the operator places UAV 20 well off to the side near the edge of the right of way to start orientation flight 70. For a tower symmetric both along and across the right of way, orientation flight 70 for a rotary wing could be straight up and down from where the operator sets UAV 20, several estimated stand-off distances from the side of the lines or near the edge of the right of way. The height of the flight can be entered by the operator or estimated by the tower inspection system from the phase conductor clearances and wire geometry (e.g. 2-2-2-2 or 2-6 or 2-3). For a tower asymmetric along the right of way, the horizontal length along the top of flight path 70 can be entered by the operator or estimated as twice the length of the strain insulators. For a tower asymmetric across the right of way a second orientation flight on the other side of the right of way may be required. During the orientation flight, the current wind at different heights can be estimated to within 20-30% by measuring the location drift during a momentary hover.

As the orientation images are acquired 160, the position of location rover 26 relative to virtual base station location 33 is recorded. This gives the (x, y, and z) camera exterior orientations at the time of image exposure for use when creating the tower model 162. The (roll, pitch, and yaw) can be recorded from the inertial measurement unit (IMU) 23 or calculated from the images if there are enough of them with enough overlap. The camera interior orientations are typically recorded during a lab calibration prior to coming out into the field. As described earlier with reference to FIG. 1, several dozen terrestrial or close-in photogrammetric software packages are available which take orientation images like 38, 39 plus camera interior and exterior orientations to create a three dimensional model 162 of tower 10, phase conductors 12, insulators 14, and shield wires 15. This model may be a point cloud, a mesh, a surface model, or a CAD representation of the size of the objects of interest and their location relative to virtual base station location 33.

To determine a standoff distance 164, the tower inspection system takes into account the inspection objectives, the current wind conditions, UAV 20 stability, and likely errors in measuring the relative position of virtual base station location 33 and UAV 20, as well as errors in measuring and modeling tower 10, insulators 14, and lines 12, 15.

One of the inspection objectives is the sample distance. Defects less than half a sample distance apart cannot be resolved. The required sample distance sets an upper bound on the standoff distance 50 for a given lens and camera sensor. Given the brightness at the time of day of the inspection, the desired SNR determines the aperture for camera 28. This in turn determines the depth of field, i.e. how much of the objects of interest are in acceptable focus in one inspection image. If there is enough light, it is desirable to stop down camera 28 to keep all the objects of interest in focus. Then the minimum standoff distance is half the hyperfocal distance.

Wind gusts, thermals, or a less stable platform require larger sample distances. For a wind still day, the standoff distance would be UAV 20 stability plus the errors in the relative position of virtual base station location 33 and UAV 20, plus the errors in measurement of tower 10, insulators 14, and lines 12 and 15. For a gusty day, the gusts are typically 20-30% of the average wind speed. The standoff distance has to be increased by the maximum gust speed multiplied by UAV 20 response time.

The next step is to generate flight segments 166 that maintain the standoff distance 50 while providing full inspection coverage of the objects of interest. This could be a number of loops around the tower. Depending on the tower geometry, the basic loop shape could be circular, oval, elliptical, or a rounded rectangle. The dimensions of the loop are determined from the three dimensional model, as described earlier. For example in a point cloud, a search upward from the centroid locates the top of the tower. Then a cylindrical search outward locates the ends of the cross arms and the wires. The loop major axis is approximately the cross-arm length plus twice the standoff distance. The loop minor axis is approximately the cross-arm width, plus the strain insulator length, plus twice the standoff distance.

The number of loops is roughly the height of tower 10 divided by the vertical field of view of camera 28. Rather than evenly spaced loops, it is better to use knowledge of the objects of interest to focus on areas with higher potential for defects. For example, the high voltage ends of insulator strings 14 experience the highest electric field gradients, so they should be inspected in detail. Hence loop 44 is flown close-in with camera 28 pointing upward and loop 46 is at about the same elevation with camera 28 pointing down. Similarly, in FIG. 3 loops (106, 108), (110, 112), (114, 116) are paired with the camera facing up, and then down. Of course, if the wind is too gusty or the thermals too strong, then the standoff distance is greater than half the phase separation and it may be too risky to fly between the phase conductors. Then the inspection might be postponed.

Once the flight segments are generated 166, then the operator is asked to verify all of them as a complete flight plan 167. People are much more likely to spot potential problems and collisions. Thus the model created in step 162 is displayed on a screen with the flight segments surrounding it. The operator can move and rotate the point of view to spot potential problem areas. An enhancement would be to allow resizing and moving of the flight segments to fine tune the inspection. This would be very similar to a simple CAD interface which allowed moving and resizing of selected objects on the screen. After the operator verifies the flight plan consisting of all the generated flight segments 167, then the flight plan is loaded into embedded processor and memory 22 for the autopilot to fly the mission 168 while acquiring inspection images (optical, UV, IR) and sensor readings (RFI, ultrasound, and others). The flight segments may be stored and communicated several different ways: as a series of waypoints, as loop centers plus major/minor axis, as spline curves, etc. Any representation of a three dimensional path can be used to communicate the segments to the autopilot. The segments are located relative to, and the inspection flight accurately flown relative to, virtual base station location 33.

If in step 156, the operator indicated adjacent towers should be inspected 170, UAV 20 then flies towards adjacent tower 172, as described earlier with reference to FIG. 4. Along the way UAV 20 acquires additional orientation images 160 to locate the adjacent tower relative to virtual base station location 33. If tower 11 has the same geometry and orientation as tower 10, then the existing flight segments are translated to a new (x, y, and z) offset. Then steps 162, 164, 166, and 167 are skipped. If the tower has a different geometry, then each of these steps is repeated for the next tower.

Once the inspection flight(s) are complete, UAV 20 returns and lands 174. Then the operator can review the results from all the inspection sensors to verify coverage and quality 176. A quick review is a simple scan through the images, checking focus, signal to noise ration, and coverage. More sophisticated would be to drape the inspection results over the 3D model generated in step 162. If enough processing power were available the model could be refined using the additional images by the photogrammetric software. Ultimately, tower inspection system 19 should be trained to recognize defects automatically.

This section illustrated details of specific embodiments, but persons skilled in the art can readily make modifications and changes that are still within the scope.

I claim:

1. A method to plan a flight to inspect a tower with an un-manned aerial vehicle comprising
    defining a reference base station,
    receiving location correction messages from a plurality of continuously operating reference stations more than two tower heights away from said tower,
    incorporating said correction messages in a location rover mounted on said unmanned aerial vehicle,
    scanning said tower in three dimensions to create a three dimensional model of said tower relative to said reference base station,
    determining a standoff distance using wind speed and stability of said unmanned aerial vehicle for said flight,
    generating a plurality of flight segments from said model maintaining said standoff distance, positioned relative to said reference base station to inspect said tower.

2. The method of claim 1 wherein said scanning comprises
    acquiring more than one orientation image of said tower,
    creating said three dimensional model of said tower from said orientation images.

3. The method of claim 1 wherein the closest of said continuously operating reference stations to said tower is defined as said reference base station.

4. The method of claim 1 wherein said reference base station is a virtual base station location defined by a network real time kinematic server.

5. A flight planning system for the inspection of a tower using an unmanned aerial vehicle comprising
    a location rover mounted on said unmanned aerial vehicle to receive correction messages from a reference base station,
    a non-contact three-dimensional scanner to create a three dimensional model of said tower relative to said reference base station,
    standoff means to determine a standoff distance using wind speed and stability of said unmanned aerial vehicle for said inspection,
    flight segment generation means to generate a plurality of flight segments from said model for said unmanned aerial vehicle relative to said reference base station, each flight segment maintaining said standoff distance from said model.

6. The apparatus of claim 5 further comprising
    a camera to acquire orientation images,
    a processor and memory to create said three dimensional model from said orientation images.

7. The apparatus of claim 5 wherein said reference base station is the closest continuously operating reference station to said tower.

8. The apparatus of claim 5 wherein said reference base station is a virtual base station location defined by a network real-time kinematic server.

9. A method to inspect a tower with an unmanned aerial vehicle comprising
    defining a reference base station, receiving location correction messages from a plurality of continuously operating reference stations more than two tower heights away from said tower, incorporating said correction messages in a location rover mounted on said unmanned aerial vehicle, scanning said tower in three dimensions to create a three dimensional model of said tower relative to said reference base station, determining a standoff distance using wind speed and stability of said unmanned aerial vehicle for said flight, generating a plurality of flight segments from said model maintaining said standoff distance, positioned relative to said reference base station to inspect said tower, communicating said flight segments to said unmanned aerial vehicle, providing a plurality of inspection sensors on said unmanned aerial vehicle, locating said unmanned aerial vehicle relative to said reference base station in near real-time, flying said flight segments with said unmanned aerial vehicle while gathering inspection data with said inspection sensors.

10. The method of claim 9 wherein said scanning comprises
acquiring more than one orientation image of said tower,
creating said three dimensional model of said tower from said orientation images.

11. The method of claim 9 wherein the closest of said continuously operating reference stations to said tower is defined as said reference base station.

12. The method of claim 9 wherein said reference base station is a virtual base station location defined by a network real time kinematic server.

13. A tower inspection system comprising
an unmanned aerial vehicle,
a location rover mounted on said unmanned aerial vehicle to receive correction messages from a reference base station,
a non-contact three-dimensional scanner to create a three dimensional model of said tower relative to said reference base station,
standoff means to determine a standoff distance using wind speed and stability of said unmanned aerial vehicle for said inspection,
flight segment generation means to generate a plurality of flight segments from said model for said unmanned aerial vehicle relative to said reference base station, each flight segment maintaining said standoff distance from said model,
inspection sensors mounted on said unmanned aerial vehicle,
locating means to determine location during flight of said unmanned aerial vehicle relative to said reference base station in near real time.

14. The apparatus of claim 13 further comprising
a camera to acquire orientation images,
a processor and memory to create said three dimensional model from said orientation images.

15. The apparatus of claim 13 wherein said reference base station is the closest continuously operating reference station to said tower.

16. The apparatus of claim 13 wherein said reference base station is a virtual base station location defined by a network real-time kinematic server.

* * * * *